UNITED STATES PATENT OFFICE.

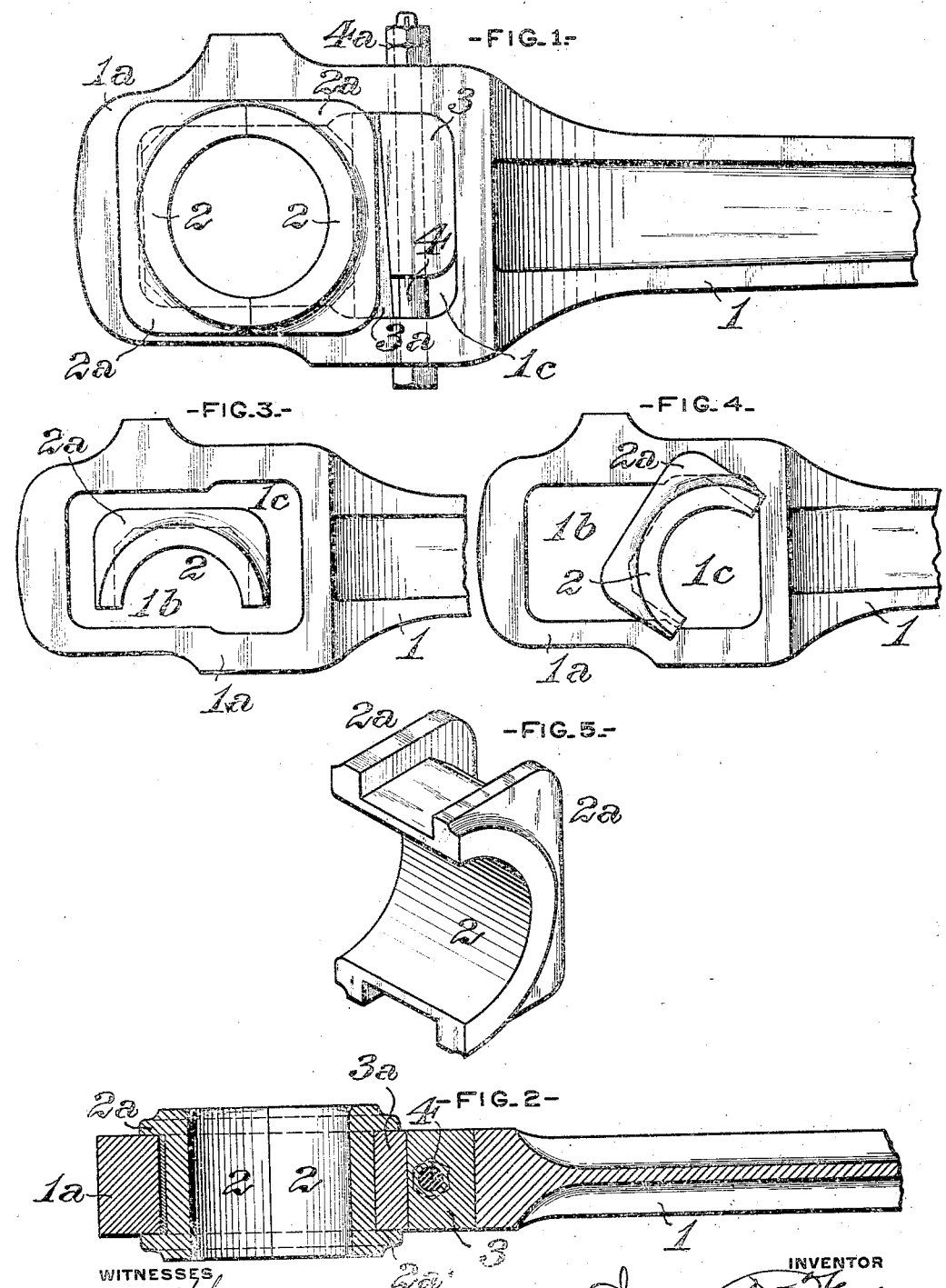

JAMES R. FOULDER, OF SCHENECTADY, NEW YORK.

CONNECTING-ROD FOR ENGINES.

1,042,543.

Specification of Letters Patent. Patented Oct. 29, 1912.

Application filed March 22, 1912. Serial No. 685,405.

*To all whom it may concern:*

Be it known that I, JAMES R. FOULDER, of Schenectady, in the county of Schenectady and State of New York, have invented a certain new and useful Improvement in Connecting-Rods for Engines, of which improvement the following is a specification.

My invention is more particularly designed for application in the main connecting rods of locomotive engines, and its object is to provide means whereby the necessity, heretofore obtaining, of cutting away the flanges of the crank pin half brasses may be obviated, and duplicate half brasses may be applied and held firmly in position, with the capacity of ready and accurate adjustment. The improvement claimed is hereinafter fully set forth.

In the accompanying drawings: Figure 1 is a side view, in elevation, of the crank pin end of a connecting rod, illustrating an application of my invention; Fig. 2, a longitudinal central section through the same; Figs. 3 and 4, side views, illustrating the manner of putting a half brass in position; and Fig. 5, a view in perspective of one of the half brasses, detached.

My invention is herein exemplified as applied in a locomotive engine main connecting rod, the body, 1, of which is of I section, as in present approved practice, and is provided with an enlarged crank pin end or head, 1ª, in which there is, as heretofore, formed a longitudinal opening or space, 1ᵇ, for the reception of the crank pin half brasses and of the wedge which holds them in position. In the practice of my invention, a wedge space, 1ᶜ, of greater depth than the opening, 1ᵇ, is formed in the head, at and adjoining the end thereof nearer the body of the rod, and communicating with the opening, 1ᵇ, the head, 1ª, being correspondingly increased in depth throughout the length of the wedge space, 1ᶜ, in order to maintain the normal strength of the strap portions of the metal of the head above and below said space. Two duplicate crank pin half brasses, 2, each bored out to a semi-cylindrical bearing surface, and having flanges, 2ª, extending entirely around its ends, which flanges fit against the sides of the head, 1ª, and thereby prevent lateral movement of the half brasses, are fitted in the opening, 1ᵇ, and are held in position therein by an adjusting wedge, 3, and an auxiliary wedge, 3ª, which wedges are drawn and held to a bearing on the half brasses, by a bolt, 4, passing freely through the strap portions of the head and engaging an internal thread in the adjusting wedge, 3, and lock nuts, 4ª, engaging a thread on the bolt, 4. The straight side of the adjusting wedge, 3, abuts against the end of the wedge space nearer the body of the rod, and its inclined side against the correspondingly inclined side of the auxiliary wedge, 3ª, the straight side of the latter abutting against the end of the adjoining half brass, 2. It will be seen that the auxiliary wedge is deeper than the adjoining half brass, that is to say, it extends from the top to the bottom of the deepened wedge space. An increased degree of adjustment and longer wedge bearing, which are very desirable features, are presented in this construction.

In connecting rods of prior construction, so far as my knowledge and information extend, it has been necessary to cut away portions of the flanges of the half brasses in order to enable them to be inserted in the head, correspondingly reducing their effectiveness, but by the provision of the deepened wedge space, 1ᶜ, above described, half brasses having full end flanges, as is desirable, may be inserted and twisted into position, as indicated in Figs. 3 and 4, and may, as before stated, be held more firmly in position and more accurately adjusted than in the constructions applied in practice prior to my invention.

I claim as my invention and desire to secure by Letters Patent:

1. The combination, with an engine connecting rod having a longitudinal crank pin brass opening formed in its head and an adjoining wedge space of greater depth, of a pair of symmetrical crank pin half brasses fitting in said opening and having symmetrical end flanges extending entirely around their bearing surfaces, and means, located in the wedge space, for adjusting said half brasses.

2. The combination, with an engine connecting rod having a longitudinal crank pin brass opening formed in its head and an adjoining wedge space of greater depth, of crank pin half brasses fitting in said opening and having semi-cylindrical bearing surfaces and end flanges extending entirely around their bearing surfaces and engaging the sides of the head to prevent lateral movement, and an adjusting wedge fitting in the wedge space and transmitting pressure to the adjacent half brasses.

3. The combination, with an engine connecting rod having a longitudinal crank pin brass opening formed in its head and an adjoining wedge space of greater depth, of crank pin half brasses fitting in said opening and having semi-cylindrical bearing surfaces and end flanges extending entirely around their bearing surfaces and engaging the sides of the head to prevent lateral movement, an adjusting wedge fitting in the wedge space, an auxiliary wedge interposed between the adjusting wedge and the adjacent half brass, and between the end flanges of said half brass, and means for moving and locking the adjusting wedge.

4. The combination, with an engine connecting rod having a longitudinal crank pin brass opening formed in its head and an adjoining wedge space of greater depth, of crank pin half brasses fitting in said opening and having semi-cylindrical bearing surfaces and end flanges extending entirely around their bearing surfaces and engaging the sides of the head to prevent lateral movement, an adjusting wedge fitting in the wedge space, an auxiliary wedge extending throughout the depth of the wedge space, between the adjusting wedge and the adjacent half brass and between the end flanges of said half brass, and means for moving and locking the adjusting wedge.

JAMES R. FOULDER.

Witnesses:
C. B. HARBISON,
A. C. NEGUS.